Patented Jan. 12, 1937

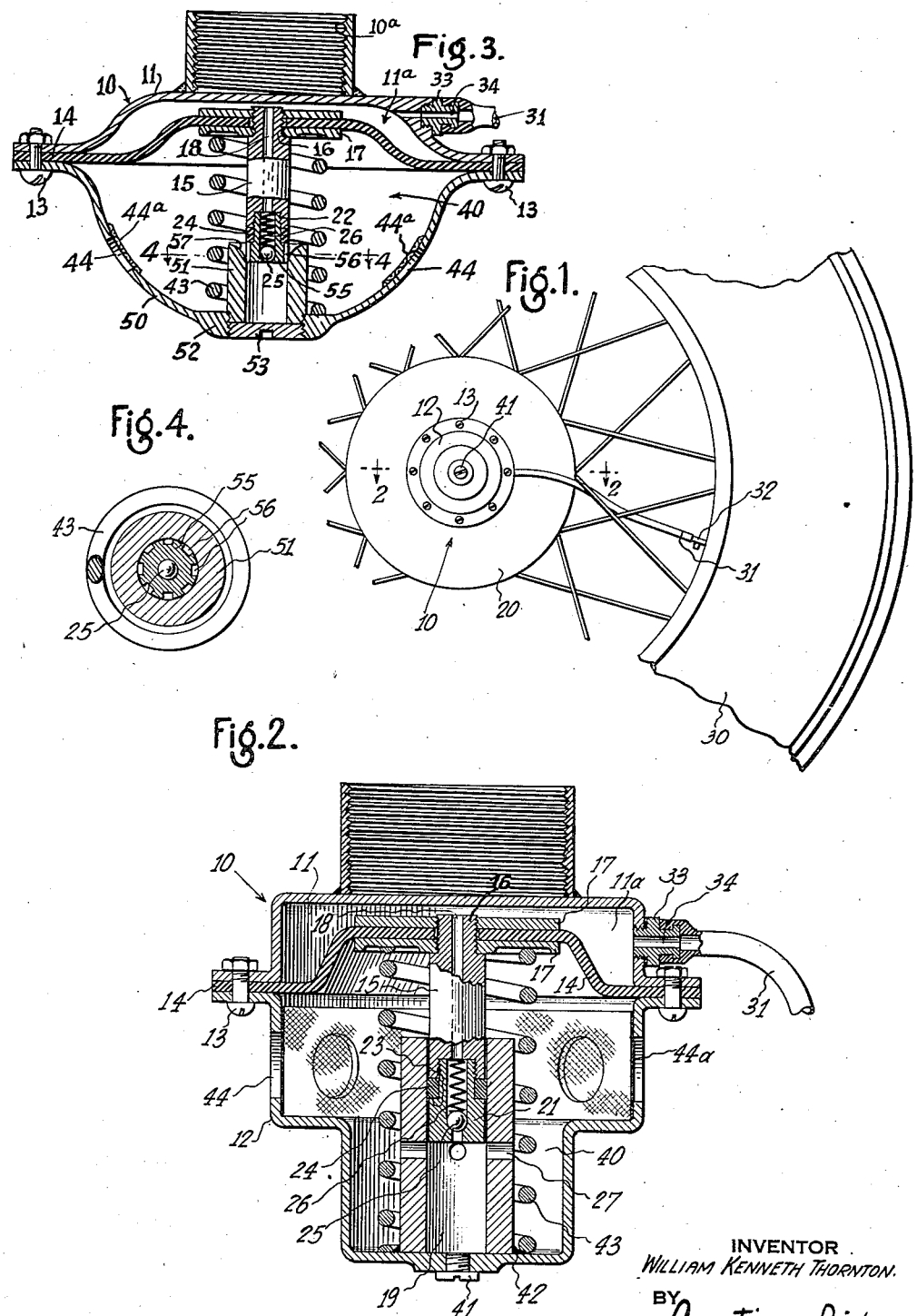

2,067,358

UNITED STATES PATENT OFFICE 2,067,358

TIRE PUMP

William Kenneth Thornton, Woodbridge, N. J.

Application September 8, 1934, Serial No. 743,236

5 Claims. (Cl. 230—35)

This invention relates to improvements in pumps for pneumatic tires and the like.

It is a feature of this invention to provide an improved pump for automobile tires which may be termed "continuously acting," which is so configured and arranged as to be adapted to be included as part of the hub or hub cap of an automobile wheel.

A further feature of this invention is the provision of an improved tire pump which is adapted to automatically maintain a desired pressure in a tire.

Another feature of this invention is the provision of an improved tire pump adapted to be mounted on the axis of rotation of an automobile wheel and which includes substantially only a single moving part.

These and other desirable features and advantages of the present invention will be described in the accompanying specification and illustrated in the drawing, certain preferred structural embodiments being shown by way of illustration only, for, since the underlying principles may be incorporated in other specific mechanical devices, it is not intended to be limited to the ones here shown, except as such limitations are clearly imposed by the appended claims.

In the drawing like numerals refer to similar parts throughout the several views, of which Fig. 1 is an elevation of the hub of an automobile wheel showing a tire pump as an associated part of a wheel hub cap and showing connection to the tire valve;

Fig. 2 is a vertical section of the pump construction shown in Fig. 1 and taken on line 2—2 of Fig. 1;

Fig. 3 is a view similar to Fig. 2 showing vertical sections through a modified form of tire pump; and Fig. 4 is a cross-section taken on line 4—4 of Fig. 3.

Referring now more specifically to the drawing, the pump 10 is shown attached to a hub plate 20 of an automobile wheel as by means of a threaded collar 10a. The pump is connected to an automobile tire 30 through a flexible conduit or tubing 31, the tire being provided with a special T-valve 32, permitting the tire to be blown up in the usual manner.

The tire pump comprises a bottom member 11 and a top 12 secured together by means of bolts and nuts 13, a diaphragm or pump actuating and driving member 14 being interposed therebetween and serving also as a gasket. The member 11 may be screwed on the hub of a wheel or fastened thereto in any desired manner.

In the form shown more in detail in Fig. 2 a chamber 11a is formed in the bottom cup between the diaphragm 14 and the base of the casing. A suitable nipple or connection 33 is tapped into this chamber 11a and the conduit or channel 34 formed thereby is of sufficient size to permit the unrestricted flow of air in and out of chamber 11a.

The diaphragm 14 of rubber, leather or other suitable material for use in diaphragm pumps, is secured to the base 16 of a piston 15 by means of clamping plates 17. These plates are adapted to screw up on the threaded base 16 of the piston 15. The piston 15 coacts with a pump cylinder 19 and is provided with an interior continuous opening 18, opening into the pump cylinder or casing 19. The piston may be provided with a detachable head 21 comprising a centrally apertured body portion having a shoulder 22 and threaded portion 23 adapted to screw into a threaded socket in the end of the member 15. A flexible washer 24 of leather or other suitable material is disposed between the head 21 and the body of the piston 15 and is held in position by screwing up the head 21 into the socket formed in member 15. The one-way valve formed in the head 21 of the piston, includes a ball 25 urged by a spring 26, the spring being adapted to seat against internal seat formed in member 15.

The pump cylinder or casing 19 is provided with ports 27, normally in free communication with chamber 40, formed by the casing member 12. A screw 41 is tapped into the head or boss of the cover 12 and is adapted to be removed to permit access to the valved head 21 of the piston 15. The pump chamber 19 may be cast integrally with the cover 12, or may be secured thereto by welding, as indicated at 42.

A compression spring 43 of suitable size is fitted over the pump chamber 19 and urges the diaphragm 14 inwardly toward the wheel. The chamber 40 in cover 12 may be provided with ports 44 giving access to the air. These apertures may be screened, as indicated generally at 44a to prevent the introduction of dirt and the like into the system.

In operation the tire may be pumped up to the desired air pressure through T-valve 32. In this operation, the chamber 11a is filled with air at the same pressure as the tire, the tire casing and the chamber 11a being in free communication, as above indicated. The air in the chamber 11a is retained in place by the one-way valve in the pump piston. The pressure of the air in the tire acts on diaphragm 14 and forces the latter outwardly against the calibrated pressure of spring 43. In such position the head 21 of the piston 15 is about flush with the ports 27 in the pump chamber 19, permitting free access of air to the chamber 19.

If the tire 30 commences to deflate through any cause, it is subjected to a considerable amount of flexing in passing over the road, and more particularly when contacting with bumps such as caused by depressions in the road or rocks. When the partially deflated tire is thus flexed, a considerable pressure is built up temporarily in the tire and this pressure is transmitted through chamber 11a to the diaphragm 14. As these pressures are in the nature of impacts, the diaphragm 14 is carried or pushed out of position carrying the plunger 15 of the pump mechanism into the pump chamber 19. In this movement of the piston 15 into the chamber 19, the head 21 of the piston passes and closes the ports 27 of the pump chamber. Continuance of the movement of piston 15 causes the entrapped air in chamber 19 to be further compressed so that it overcomes the back pressure exerted by the air in chamber 11a and the pressure of spring 26 normally maintaining ball valve 25 seated in closed position. Thus the compressed air in chamber 19 is forced back into chamber 11a. As the number of impacts to which a partly deflated tire is subjected are quite numerous, the increments of air pumped into the tire casing by the piston 15 are considerable in number.

In running an automobile under ordinary road conditions, it is found possible to maintain and restore an air pressure within a run of one or two miles. When the air in the casing 30 has been restored to its normal pressure, the diaphragm 14 will be maintained in the desired state of equilibrium by the opposing forces of the air in the tire and the compression spring 43.

Referring now more particularly to Figs. 3 and 4, a modified form of construction is shown in which the hub cap 50 is provided with a pump casing or cylinder 51, secured thereto in any desired manner, and preferably by tapping same into the head 52 of the cover. A screw plate 53 also engages the head 52 and serves to seal off the pump chamber from the outside air. The casing 51 of the pump chamber is provided with continuous walls and is not apertured as in the form shown in Fig. 2. The piston 15 of the pump is provided with a modified piston head 55 having longitudinal peripheral slots 56 formed therein. The usual washer 24 is provided for the piston assembly, the piston also being provided with the usual ball valve 25 and spring 26. The bottom of the pump casing 51 is internally belled or flared, as indicated at 57, to permit the smooth passage of the piston ring 24 into contact with the walls of the pump chamber.

In normal unflexed operation, the piston head 55 extends a sufficient distance into the pump chamber to seat itself properly therein, permitting free access of air from the chamber 40 to the interior of the pump cylinder through the longitudinal slots or ports 56. When the piston is moved inwardly of the pump chamber, the piston ring or washer 24 is moved past the bell mouth into engagement with the walls of the pump chamber, thereby sealing the latter off from the atmosphere and permitting the contained air therein to be compressed by further movement of the pump piston.

It will now be appreciated that there has been provided novel pump mechanisms, particularly adapted for use in automobile wheels and intended principally for mounting on the axes of said wheels, whereby any effects due to centrifugal action on rotating members is done away with. In addition, the novel pump mechanism of the present invention is formed with substantially a single moving part, thus avoiding difficulties normally incident to the association of a number of moving parts in any pump mechanism. Further features of novelty of the present invention reside in the use of an auxiliary air pressure chamber to augment the action of a compression spring for maintaining a desired air pressure balance in the tire and pump system. Another feature of advantage herein disclosed resides in the incorporation of a novel pump mechanism in a hub cap for automobile wheels, whereby the latter may be mounted in place of or form a part of the usual hub cap and permits direct connection to the tires, whereby to maintain them at a desired operative pressure under all circumstances, avoiding the troubles consequent upon the usual slow leakage encountered in use.

While the foregoing description has been set forth in general and in detail in respect to specific ideas, it will be understood that changes and modifications may be made therein and that such changes and modifications are to be considered within the scope of the invention as defined in the subjoined claims.

What is claimed is:

1. A pump, comprising, in combination, a pair of body portions and a flexible diaphragm secured therebetween, one of said body portions forming a chamber with the diaphragm, a fluid reservoir in direct communication with said chamber, said fluid reservoir normally being subjected to varying operating pressures, the other of said body portions forming a second chamber with the diaphragm and being provided with a pump cylinder casing having apertures opening into the said second chamber and the latter being in turn in communication with the external air; a hollow piston mounted in the pump cylinder and secured to the flexible diaphragm for actuation thereby, the said hollow piston being provided with a one-way valve structure effecting communication between the pump cylinder and the first said chamber.

2. An automatic pump assembly, comprising, in combination, a fluid reservoir, a two-part casing, a flexible diaphragm between the members of the casing forming two chambers therewith, one of said chambers being in air-tight communication with the fluid reservoir, the said reservoir normally being subjected to varying operating pressures, the other said chamber being in communication with a supply of replenishing fluid and provided with a pump cylinder having a hollow piston therein, the said pump cylinder being in communication with the chamber in which it is disposed and the said piston being provided with a one-way valve and secured to the said diaphragm whereby to be actuated thereby and to provide uni-directional access of fluid from the said pump cylinder to the said fluid reservoir.

3. An air pump comprising a diaphragm-actuated pump mechanism, a casing for the mechanism comprising a cover and a bottom portion having an outlet, a fluid reservoir connected to the outlet, the said casing being divided into two parts by the diaphragm and forming two chambers therewith, the chamber formed by the cover and the diaphragm being in free communication with the air; an apertured and valved piston mounted on the diaphragm and adapted to move therewith, a pump cylinder mounted on the cover of the device and adapted to receive the valved piston in operative engagement; ports in the pump cylinder permitting access of air from the chamber formed by the casing cover and the diaphragm, the said ports being adapted to be closed by the piston upon movement thereof by the diaphragm.

4. A pump mechanism comprising a two-part casing having an apertured cover and a fluid-tight bottom portion, the bottom portion being provided with an outlet, a pump cylinder and associated piston in the casing, a diaphragm in the casing and dividing the same into two chambers, a fluid reservoir connected to the said outlet, one of the said chambers communicating with said reservoir, the chamber formed by the cover and the diaphragm serving as a housing for the pump cylinder; a compression spring surrounding the said pump cylinder and bearing against the diaphragm, the piston being hollow and being secured to the diaphragm and adapted for sliding engagement in the pump cylinder, the said piston being provided with a one-way valve, and ports in the pump cylinder normally open to the chamber formed by the diaphragm and cover and adapted to be closed by the piston upon movement of the pump diaphragm.

5. A pump mechanism, including, in combination, a pair of opposed body portions comprising an apertured cover and a bottom provided with an outlet, the said pump having a flexible diaphragm between the cover and the bottom and dividing the same into two chambers, a fluid reservoir, the bottom of the pump mechanism forming a chamber with the diaphragm, the so-formed chamber being in direct communication with the fluid reservoir, the said cover being provided with a pump cylinder in the chamber formed with the said diaphragm, said pump cylinder having a belled mouth opening into the said second chamber and being secured to the cover, a screw plate secured to the said cover and serving as a closure for the pump cylinder, a hollow piston in the pump cylinder and mounted on the flexible diaphragm, the piston head being provided with a series of peripheral slots adapted to permit the access of air from the second said casing chamber to the pump cylinder, the said slots being so constituted and arranged as to be closed by the walls of the cylinder when the piston is urged into the body of the pump cylinder by the movement of the diaphragm.

WILLIAM KENNETH THORNTON.